（12）United States Patent
Kanamoto et al.

(10) Patent No.: US 6,502,007 B1
(45) Date of Patent: Dec. 31, 2002

(54) OPTIMIZATION METHOD AND DEVICE OF NC PROGRAM IN NC MACHINING

(75) Inventors: Masao Kanamoto, Yamatokoriyama (JP); Yasushi Fukaya, Niwa-gun (JP); Sadayuki Matsumiya, Kawasaki (JP); Kazuo Yamazaki, 1500, 7th St. #7-0, Sacramento, CA (US) 95814

(73) Assignees: Mori Seiki Co., Ltd., Yamatokoriyama (JP); Okuma Corporation, Nagoya (JP); Mitutoyo Corporation, Kawasaki (JP); Kazuo Yamazaki, Sacremento, CA (US)

( * ) Notice: Subject to any disclaimer, the term of this patent is extended or adjusted under 35 U.S.C. 154(b) by 0 days.

(21) Appl. No.: 09/530,019

(22) PCT Filed: Aug. 28, 1998

(86) PCT No.: PCT/JP98/03836

§ 371 (c)(1),
(2), (4) Date: May 15, 2000

(87) PCT Pub. No.: WO00/12258

PCT Pub. Date: Mar. 9, 2000

(51) Int. Cl.[7] .......................................... G05B 19/4093
(52) U.S. Cl. ........................................ 700/173; 700/28
(58) Field of Search ............................ 700/19, 20, 28, 700/32, 76, 86, 87, 159, 160, 169, 31, 173; 717/168

(56) References Cited

U.S. PATENT DOCUMENTS

| | | | | |
|---|---|---|---|---|
| 3,548,172 A | * | 12/1970 | Centner et al. | 318/561 |
| 3,634,664 A | * | 1/1972 | Valek | 318/561 |
| 3,798,612 A | * | 3/1974 | Struger et al. | 700/86 |
| 5,315,503 A | * | 5/1994 | Kato et al. | 700/180 |
| 5,933,353 A | * | 8/1999 | Abriam et al. | 700/171 |
| 5,970,251 A | * | 10/1999 | Zimmermann et al. | 717/168 |

FOREIGN PATENT DOCUMENTS

| | | |
|---|---|---|
| JP | A-58-126039 | 7/1983 |
| JP | A-6-155233 | 6/1994 |

* cited by examiner

Primary Examiner—Leo Picard
Assistant Examiner—Alexander Kosowski
(74) Attorney, Agent, or Firm—Oliff & Berridge, PLC

(57) ABSTRACT

In NC machining in which machining control is performed through An NC program, machining conditions at the time of actual machining are reflected in the NC program. At this time, there are two types of modes comprising an analytic storage mode in which actual machining conditions are reflected in the NC program as they are and an optimization mode in which optimization processing applies to the actual machining conditions and the result is reflected in the NC machining program, and either of them is selected according to conditions.

8 Claims, 23 Drawing Sheets

SAMPLE NC PROGRAM

| | |
|---|---|
| 001 | O 0001 |
| 002 | G90 G80 G40 |
| 003 | G91 G28 Z0 |
| 004 | T1 |
| 005 | M6 |
| 006 | N1(FACE MILL 100mm DIA.) |
| 007 | F90 G54 G0 X160. Y50. S400 M3 T5 |
| 008 | G43 Z50. H1 M8 |
| 009 | G1 Z2.5 F2000 |
| 010 | X-160. F250 |
| 011 | G0 Y-45. |
| 012 | G1 X160. |
| 013 | G0 Y50. |
| 014 | G1 Z.1 |
| 015 | X-160. |
| 016 | G0 Y-45. |
| 017 | G1 X160. |
| 018 | G0 Y50. S600 |
| 019 | G1 Z0 F400 |
| 020 | X-160. |
| 021 | G0 X-45. |
| 022 | G1 X160. |
| 023 | G0 Z100. |
| 024 | G55 G0 X160. Y50. S400 |
| 025 | Z50. |
| 026 | G1 Z2.5 F2000 |
| 027 | X-160. F250 |
| 028 | G0 Y-45. |
| 029 | G1 X160. |
| 030 | G0 Y50. |
| 031 | G1 Z.1 |
| 032 | X-160. |
| 033 | G0 Y-45. |
| 034 | G1 X160. |
| 035 | G0 Y50. S600 |
| 036 | G1 Z0 F400 |
| 037 | X-160. |
| 038 | G0 Y-45 |
| 039 | G1 X160. |
| 040 | G0 Z50. M9 |
| 041 | G91 G28 Z0 M6 |
| 042 | M1 |
| 043 | N2(END MILL 25mm DIR ROUGH) |
| 044 | G90 G54 G0 X10. Y-125. S310 M3 T6 |
| 045 | G43 Z50. H5 M8 |
| 046 | G1 Z-15. F2000 |
| 047 | G2 J125. F90 |
| 048 | G1 Y-112.5 |
| 049 | G2 J112.5 |
| 050 | G1 Y-100. |
| 051 | G2 J100. |
| 052 | G1 X27.5 Y-105. |
| 053 | G3 X10. Y87.5 R17.5 |
| 054 | G2 J87.5 |
| 055 | G1 X27.5 Y-90.2 |
| 056 | G3 X10. Y-72.7 R17.5 |
| 057 | G2 J72.7 |
| 058 | G0 Z10. |
| 059 | Y-125. |
| 060 | G1 Z-30. F2000 |
| 061 | G2 J125. F90 |
| 062 | G1 Y-1125.5 |
| 063 | G2 J112.5 |
| 064 | G1 Y-100. |
| 065 | G2 J100. |
| 066 | G1 X27.5 Y-105. |
| 067 | G3 X10. Y-87.5 R17.5 |
| 068 | G2 J87.5 |
| 069 | G1 X27.5 Y-90.2 |
| 070 | G3 X10. Y-72.7 R17.5 |

Fig. 3A

| | | | |
|---|---|---|---|
| 071 | G2 J72.7 | 107 | G0 Z50. M9 |
| 072 | G0 Z10. | 108 | G91 G28 Z0 M6 |
| 073 | Y-125. | 109 | M1 |
| 074 | G1 Z-39.8 G2000 | 110 | N4(CENTER DRILL) |
| 075 | G2 J125. F90 | 111 | G90 G54 G0 X-70. Y50 S1000 M3 T3 |
| 076 | G1 Y-112.5 | 112 | G43Z Z50. H2 M8 |
| 077 | G2 Y-112.5 | 113 | G99 G81 Z-43. R-38. F100 |
| 078 | G1 Y-100. | 114 | Y-50. |
| 079 | G2 Y100. | 115 | G0 Z100. |
| 080 | G1 X27.5 Y-105. | 116 | G90 G55 G0 X0 Y-20. |
| 081 | G3 X10. Y87.5 R17.5 | 117 | Z50. |
| 082 | G2 J87.5 | 118 | G99 G81 Z-30. R2. F100 |
| 083 | G1 X27.5 Y-90.2 | 119 | G0 Z50. M9 |
| 084 | G3 X10. Y-72.7 R17.5 | 120 | G91 G28 Z0 M6 |
| 085 | G2 J727.7 | 121 | M1 |
| 086 | G0 Z10. M9 | 122 | N5(DRILL 20mm DIA.) |
| 087 | G91 G28 Z0 M6 | 123 | G90 G54 G0 X-70. Y50. S400 M3 T4 |
| 088 | M1 | 124 | G43 Z50. H3 M8 |
| 089 | N3(END MILL 25mm DIR FINISH) | 125 | G99 G81 Z-65. R-38. F80 |
| 090 | G90 G54 G0 X10. Y-125. S400 M3 T2 | 126 | Y-50. |
| 091 | G43 Z50. H6 M8 | 127 | G0 Z50. M9 |
| 092 | G1 Z-40. F2000 | 128 | G91 G28 Z0 M6 |
| 093 | G2 J125. F110 | 129 | M1 |
| 094 | G1 Y-112.5 | 130 | N6(DRILL 30mm DIA.) |
| 095 | G2 J112.5 | 131 | G90 G55 G0 X0. Y-20. S300 M3 T5 |
| 096 | G1 Y-100. | 132 | G43 Z50. H4 M8 |
| 097 | G2 J100. | 133 | G99 G81 Z-21. R2. F60 |
| 098 | G1 X27.5 Y-105. | 134 | G0 Z50. M9 |
| 099 | G3 X10. Y-87.5 R17.5 | 135 | G91 G28 Z0 M6 |
| 100 | G2 J87.5 | 136 | M1 |
| 101 | G3 X-7.5 Y-105. R17.5 | 137 | N7(END MILL 25mm DIR ROUGH) |
| 102 | G41 G1 X40.Y90.D6 | 138 | G90 G55 G0 X0 Y-20. S310 M3 T7 |
| 103 | G3 X10. Y-60. R30. | 139 | G43 Z50. H5 M8 |
| 104 | G2 J60. | 140 | G1 Z-10. F2000 |
| 105 | G3 X-20. Y-90. R3. | 141 | Z-20. F35 |
| 106 | G40 G1 X0 | 142 | G41 X-20. D5 |

Fig. 3B

```
143  G3 I20. F50
144  G40 G1 X0
145  G0 Z10. M9
146  G91 G28 Z0 M6
147  M1
148  N8(DRILL 8.2mm)
149  G90 G55 G0 X0 Y-20 S1000 M3 T8
150  G43 Z50. H7 M8
151  G98 G81 Z-45. R-19. F150
152  G0 Z50. M9
153  G91 G28 Z0 M6
154  M1
155  N9(CHAMFER 25mm DIA.)
156  G90 G54 G0 X-70. Y50. S500 M3 T9
157  G43 Z10. H8 M8
158  G98 G81 Z-51. R-48. F50
159      Y-50.
160  G0 Z100
161  G90 G55 G0 X0 Y-20. S800
162      Z10.
163  G98 G81 Z-25. R-22. F80
164  G0 Z50. M9
165  G91 G28 Z0 M6
166  M1
167  N10(TAP M10 P1.25)
168  G90 G55 G0 X0 Y-20. T1
169  G43 Z10. H9 M8
170  M29 S320
171  G98 G84 Z-40. R-10. F400
172  G0 Z50. M9
173  G91 G28 Y0 Z0 M6
174  M30
```

Fig. 3C

BASE MATERIAL DIMENTIONS
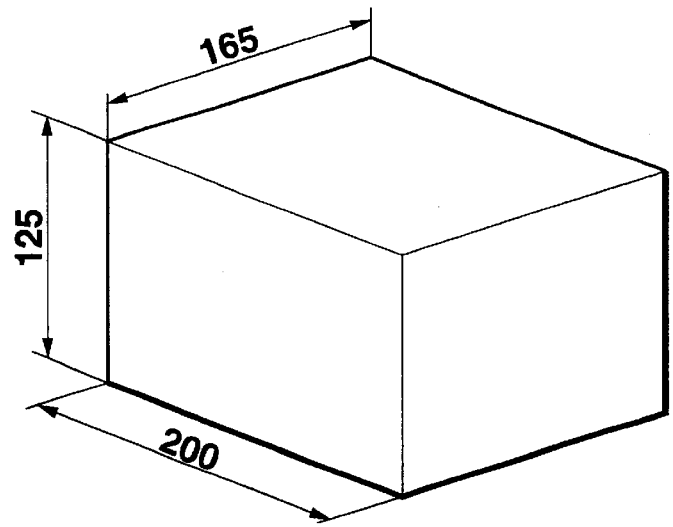
Fig. 4
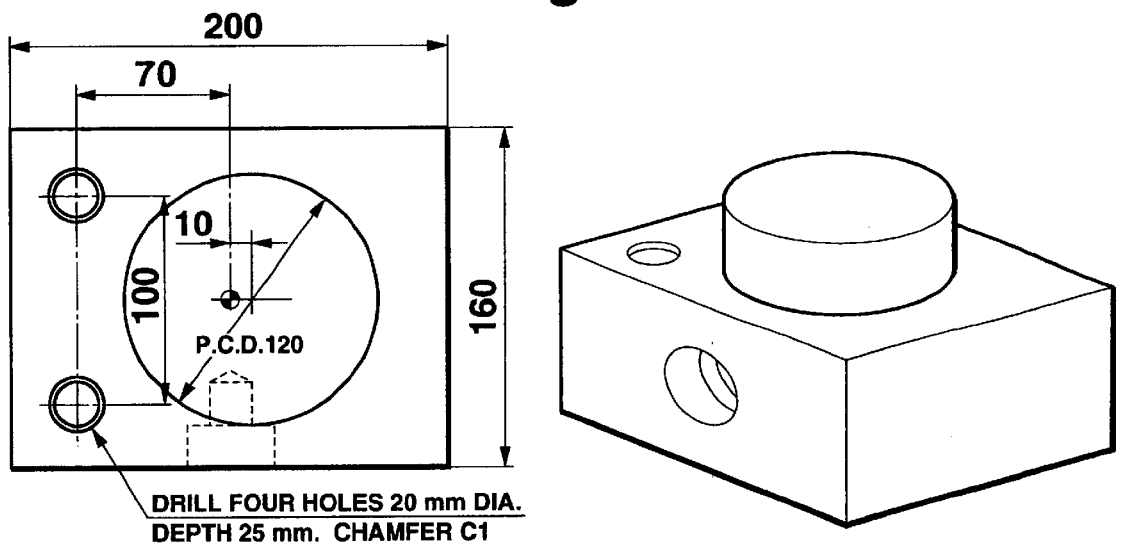
DRILL FOUR HOLES 20 mm DIA.
DEPTH 25 mm. CHAMFER C1
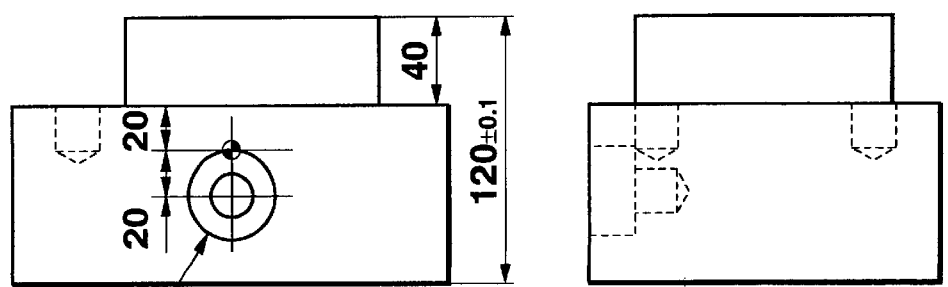
SPOT-FACING (COUNTERBORE) 40 mm DIA. DEPTH 20 mm.
M10 TAP   P = 1.25 mm
LOWER DRILL 8.2 mm DIA.  DEPTH 25 mm
Fig. 5

O0001 TOOL LIST

| TOOL NAME | MANUFAC-TURER | HOLDER TYPE NO. | CHIP TYPE NO. | CHIP MATERIAL | NOMINAL DIAMETER | T CODE | H CODE | D CODE | NO. OF TEETH | TOOTH LENGTH | TOOL LENGTH | PITCH | ANGLE |
|---|---|---|---|---|---|---|---|---|---|---|---|---|---|
| FACE MILL | ABC COMPANY | A-01 | B-01 | CEMENTED CARBIDE (HARD METAL) | 100.000 | 1 | 1 | 1 | 6 | 10.000 | 20.000 | - | 90 |
| CENTER DRILL | ABC COMPANY | A-02 | B-02 | HIGH SPEED STEEL | 3.000 | 2 | 2 | 2 | - | 5.000 | 20.000 | - | - |
| DRILL | ABC COMPANY | A-03 | B-03 | HIGH SPEED STEEL | 20.000 | 3 | 3 | 3 | - | 150.000 | 160.000 | - | 118 |
| DRILL | ABC COMPANY | A-04 | B-04 | HIGH SPEED STEEL | 30.000 | 4 | 4 | 4 | - | 150.000 | 160.000 | - | 118 |
| END MILL | ABC COMPANY | A-05 | B-05 | HIGH SPEED STEEL | 25.000 | 5 | 5 | 5 | 2 | 50.000 | 60.000 | - | - |
| END MILL | ABC COMPANY | A-06 | B-06 | HIGH SPEED STEEL | 25.000 | 6 | 6 | 6 | 2 | 45.000 | 60.000 | - | - |
| DRILL | ABC COMPANY | A-07 | B-07 | HIGH SPEED STEEL | 8.200 | 7 | 7 | 7 | - | 50.000 | 100.000 | - | 118 |
| CHAMFER | ABC COMPANY | A-08 | B-08 | HIGH SPEED STEEL | 25.000 | 8 | 8 | 8 | 2 | 10.000 | 80.000 | - | 45 |
| TAP | ABC COMPANY | A-09 | B-09 | HIGH SPEED STEEL | M10 | 9 | 9 | 9 | - | 30.000 | 50.000 | 1.25 | 45 |

Fig. 6

G CODE EXPANSION LIST

| LINE NO. | O | N | NT | ST | WK | X COORDINATE | Y COORDINATE | Z COORDINATE | S | M | F | AXIS | INTER-PORATION | R | I | J | G80 | G98 | R POINT | G40 | G43 | H | D |
|---|---|---|---|---|---|---|---|---|---|---|---|---|---|---|---|---|---|---|---|---|---|---|---|
| 1 | 1 | | | | | | | | | | | | | | | | | | | | | | |
| 2 | | 1 | | | | | | | | | | | | | | | | | | | | | | |
| 3 | | | | | | | | FIRST ORIGIN | | | | Z | G0 | | | | | | | | | | |
| 4 | | | 1 | 1 | | | | | | | | | | | | | | | | | | | | |
| 5 | | 1 | | | | | | | | | | | | | | | | | | | | | | |
| 6 | | | 5 | | | | | | | 6 | | | | | | | | | | | | | | |
| 7 | | | | | 54 | 160.000 | 50.000 | | 400 | 3 | | XY | G0 | | | | | | | | | | |
| 8 | | | | | | | | 50.000 | | 8 | | Z | G0 | | | | | | | | | | |
| 9 | | | | | | | | 2.500 | | | 2000 | Z | G1 | | | | | | | 40 | 43 | 1 | |
| 10 | | | | | | -160.000 | | | | | 250 | X | G1 | | | | | | | | | | |
| 11 | | | | | | | -45.000 | | | | | Y | G0 | | | | | | | | | | |
| 12 | | | | | | 160.000 | | | | | | X | G1 | | | | | | | | | | |
| 13 | | | | | | | 50.000 | | | | | Y | G1 | | | | | | | | | | |
| 14 | | | | | | | | 0.100 | | | | Z | G0 | | | | | | | | | | |
| 15 | | | | | | -160.000 | | | | | | X | G1 | | | | | | | | | | |
| 16 | | | | | | | -45.000 | | | | | Y | G1 | | | | | | | | | | |
| 17 | | | | | | 160.000 | | | | | | X | G1 | | | | | | | | | | |
| 18 | | | | | | | 50.000 | | | | | Y | G0 | | | | | | | | | | |
| 19 | | | | | | | | 0.000 | 600 | | 400 | Z | G1 | | | | 80 | | | | | | |
| 20 | | | | | | -160.000 | | | | | | X | G0 | | | | | | | | | | |
| 21 | | | | | | | -45.000 | | | | | Y | G1 | | | | | | | | | | |
| 22 | | | | | | 160.000 | | | | | | X | G0 | | | | | | | | | | |
| 23 | | | | | | | | 100.000 | | | | Z | G0 | | | | | | | | | | |
| 24 | | | | | 55 | 160.000 | 50.000 | | 400 | | | XY | G0 | | | | | | | | | | |
| 25 | | | | | | | | 50.000 | | | | Z | G0 | | | | | | | | | | |
| 26 | | | | | | | | 2.500 | | | 2000 | Z | G1 | | | | | | | | | | |
| 27 | | | | | | -160.000 | | | | | 250 | X | G1 | | | | | | | | | | |
| 28 | | | | | | | -45.000 | | | | | Y | G0 | | | | | | | | | | |
| 29 | | | | | | 160.000 | | | | | | X | G1 | | | | | | | | | | |
| 30 | | | | | | | 50.000 | | | | | Y | G1 | | | | | | | | | | |
| 31 | | | | | | | | 0.100 | | | | Z | G0 | | | | | | | | | | |
| 32 | | | | | | -160.000 | | | | | | X | G1 | | | | | | | | | | |
| 33 | | | | | | | -45.000 | | | | | Y | G1 | | | | | | | | | | |
| 34 | | | | | | 160.000 | | | | | | X | G0 | | | | | | | | | | |
| 35 | | | | | | | 50.000 | | | | | Y | G1 | | | | | | | | | | |
| 36 | | | | | | | | 0.000 | 600 | | 400 | Z | G1 | | | | | | | | | | |

Fig. 7A

| LINE NO. | O | N | NT | ST | WK | X COORDINATE | Y COORDINATE | Z COORDINATE | S | M | F | AXIS | INTER-PORATION | R | I | J | G80 | G98 | R POINT | G40 | G43 | H | D |
|---|---|---|---|---|---|---|---|---|---|---|---|---|---|---|---|---|---|---|---|---|---|---|---|
| 37 | | | | | | -160.000 | -45.000 | | | | | X | G1 | | | | | | | | | | |
| 38 | | | | | | | | | | | | Y | G0 | | | | | | | | | | |
| 39 | | | | | | 160.000 | | | | | | X | G1 | | | | | | | | | | |
| 40 | | | | 5 | | | | 50.000 | | 9 | | Z | G0 | | | | | | | | | | |
| 41 | | | | | | | | FIRST ORIGIN | | 6 | | Z | G0 | | | | | | | | | | |
| 42 | | | | | | | | | | 1 | | | | | | | | | | | | | |
| 43 | | 2 | | | | | | | | | | | | | | | | | | | | | | |
| 44 | | | 6 | | 54 | 10.000 | -125.000 | 50.000 | 310 | 3 | | XY | G0 | | | | | | | | | | |
| 45 | | | | | | | | | | 8 | | Z | G0 | | | | | | | | | | |
| 46 | | | | | | | | -15.000 | | | 2000 | Z | G1 | | | | | | | | | | |
| 47 | | | | | | | | | | | 90 | XY | G2 | | | 125.000 | | | | | | | |
| 48 | | | | | | | -112.500 | | | | | Y | G1 | | | | | | | | | | |
| 49 | | | | | | | | | | | | XY | G2 | | | 112.500 | | | | | | | |
| 50 | | | | | | | -100.000 | | | | | Y | G1 | | | | | | | | | | |
| 51 | | | | | | | | | | | | XY | G2 | | | 100.000 | | | | | | | |
| 52 | | | | | | 27.500 | -105.000 | | | | | XY | G1 | | | | | | | | | | |
| 53 | | | | | | 10.000 | -87.500 | | | | | XY | G3 | 17.500 | | 87.500 | | | | | | | |
| 54 | | | | | | | | | | | | XY | G2 | | | | | | | | | | |
| 55 | | | | | | 27.500 | -90.200 | | | | | XY | G1 | | | | | | | | | | |
| 56 | | | | | | 10.000 | -72.700 | | | | | XY | G3 | 17.500 | | 72.700 | | | | | | | |
| 57 | | | | | | | | | | | | XY | G2 | | | | | | | | | | |
| 58 | | | | | | | | 10.000 | | | | Z | G0 | | | | | | | | | | |
| 59 | | | | | | | | | | | | Y | G0 | | | | | | | | | | |
| 60 | | | | | | | | -30.000 | | | 2000 | Z | G1 | | | | | | | | | | |
| 61 | | | | | | | | | | | 90 | XY | G2 | | | 125.000 | | | | | | | |
| 62 | | | | | | | -112.500 | | | | | Y | G1 | | | | | | | | | | |
| 63 | | | | | | | | | | | | XY | G2 | | | 112.500 | | | | | | | |
| 64 | | | | | | | -100.000 | | | | | Y | G1 | | | | | | | | | | |
| 65 | | | | | | | | | | | | XY | G2 | | | 100.000 | | | | | | | |
| 66 | | | | | | 27.500 | -105.000 | | | | | XY | G1 | | | | | | | | | | |
| 67 | | | | | | 10.000 | -87.500 | | | | | XY | G3 | 17.500 | | 87.500 | | | | | | | |
| 68 | | | | | | | | | | | | XY | G2 | | | | | | | | | | |
| 69 | | | | | | 27.500 | -90.200 | | | | | XY | G1 | | | | | | | | | | |
| 70 | | | | | | 10.000 | -72.700 | | | | | XY | G3 | 17.500 | | 72.700 | | | | | 43 | 5 | |
| 71 | | | | | | | | | | | | XY | G2 | | | | | | | | | | |
| 72 | | | | | | | | 10.000 | | | | Z | G0 | | | | | | | | | | |
| 73 | | | | | | | -125.000 | | | | | Y | G0 | | | | | | | | | | |
| 74 | | | | | | | | -39.800 | | | 2000 | Z | G1 | | | | | | | | | | |
| 75 | | | | | | | | | | | 90 | XY | G2 | | | 125.000 | | | | | | | |

Fig. 7B

| LINE NO. | O | N | NT | ST | WK | X COORDINATE | Y COORDINATE | Z COORDINATE | S | M | F | AXIS | INTER-PORATION | R | I | J | G80 | G98 | R POINT | G40 | G43 | H | D |
|---|---|---|---|---|---|---|---|---|---|---|---|---|---|---|---|---|---|---|---|---|---|---|---|
| 76 | | | | | | | -112.500 | | | | | Y | G1 | | | | | | | | | | |
| 77 | | | | | | | -100.000 | | | | | XY | G2 | | | 112.500 | | | | | | | |
| 78 | | | | | | | -100.000 | | | | | Y | G1 | | | 100.000 | | | | | | | |
| 79 | | | | | | | | | | | | XY | G2 | | | | | | | | | | |
| 80 | | | | | | 27.500 | -105.000 | | | | | XY | G1 | | | | | | | | | | |
| 81 | | | | | | 10.000 | -87.500 | | | | | XY | G3 | 17.500 | | 87.500 | | | | | | | |
| 82 | | | | | | 27.500 | -90.200 | | | | | XY | G2 | | | | | | | | | | |
| 83 | | | | | | 10.000 | -72.700 | | | | | XY | G3 | 17.500 | | 72.700 | | | | | | | |
| 84 | | | | | | | | | | | | XY | G2 | | | | | | | | | | |
| 85 | | | | | | | | 10.000 | | 9 | | Z | G0 | | | | | | | | | | |
| 86 | | | | | | | | FIRST ORIGIN | | 6 | | Z | G0 | | | | | | | | | | |
| 87 | | | | | | | | | | 1 | | | | | | | | | | | | | |
| 88 | | | | | | | | | | | | | | | | | | | | | | | |
| 89 | | 3 | | 6 | | | | | | | | | | | | | | | | | | | |
| 90 | | | 2 | | 54 | 10.000 | -125.000 | | 400 | 3 | | XY | G0 | | | | | | | | | | |
| 91 | | | | | | | | 50.000 | | 8 | | Z | G0 | | | | | | | | | | |
| 92 | | | | | | | | -40.000 | | | 2000 | Z | G1 | | | | | | | | | | |
| 93 | | | | | | | | | | | 90 | Y | G1 | | | | | | | | | | |
| 94 | | | | | | | -112.500 | | | | | Y | G1 | | | | | | | | | | |
| 95 | | | | | | | -100.000 | | | | | XY | G2 | | | 125.000 | | | | | | | |
| 96 | | | | | | 27.500 | -105.000 | | | | | XY | G1 | | | 112.500 | | | | | | | |
| 97 | | | | | | 10.000 | -87.500 | | | | | XY | G3 | 17.500 | | 100.000 | | | | | | | |
| 98 | | | | | | | | | | | | XY | G2 | | | | | | | | | | |
| 99 | | | | | | -7.500 | -105.000 | | | | | XY | G1 | | | | | | | | | | |
| 100 | | | | | | 40.000 | -90.000 | | | | | XY | G3 | 17.500 | | 87.500 | | | | | | | |
| 101 | | | | | | 10.000 | -60.000 | | | | | XY | G3 | 30.000 | | 60.000 | | | | | | | |
| 102 | | | | | | | | | | | | XY | G2 | | | | | | | | | | |
| 103 | | | | | | -20.000 | -90.000 | | | | | XY | G1 | | | | | | | | | | |
| 104 | | | | | | 0 | | | | | | X | G1 | | | | | | | | | | |
| 105 | | | | | | | | 50.000 | | 9 | | Z | G0 | | | | | | | | | | |
| 106 | | | | | | | | FIRST ORIGIN | | 6 | | Z | G0 | | | | | | | | | | |
| 107 | | | 2 | | | | | | | 1 | | | | | | | | | | | | | |
| 108 | | | | | | | | | | | | | | | | | | | | | | | |
| 109 | | 4 | | | | | | | | | | | | | | | | | | | | | |
| 110 | | | 3 | | 54 | -70.000 | 50.000 | | 1000 | 3 | | XY | G0 | | | | | | | | 41 | 43 | 6 |
| 111 | | | | | | | | 50.000 | | 8 | | Z | G0 | | | | | | | | 40 | | | 6 |
| 112 | | | | | | | | -43.000 | | | 100 | Z | G1 | | | | 81 | 99 | -38.000 | | 43 | 2 | |
| 113 | | | | | | | -50.000 | | | | | Z | G0 | | | | | | | | | | |
| 114 | | | | | | | | | | | | | | | | | | | | | | | |

| LINE NO. | O | N | NT | ST | WK | X COORDINATE | Y COORDINATE | Z COORDINATE | S | M | F | AXIS | INTER-PORATION | R | I | J | G80 | G98 | R POINT | G40 | G43 | H | D |
|---|---|---|---|---|---|---|---|---|---|---|---|---|---|---|---|---|---|---|---|---|---|---|---|
| 115 | | | | | | | | 100.000 | | | | | | | | | | | | | | | |
| 116 | | | | | 55 | | -20.000 | | | | | | | | | | | | | | | | |
| 117 | | | | | | 0 | | 50.000 | | | | XY | G0 | | | | | | | | | | |
| 118 | | | | | | | | -3.000 | | | 100 | Z | G0 | | | | | | | | | | |
| 119 | | | | | | | | 50.000 | | 9 | | Z | G0 | | | | 81 | 99 | 2.000 | | | | |
| 120 | | | 3 | | | | | FIRST ORIGIN | | 6 | | Z | G0 | | | | | | | | | | |
| 121 | | | | | | | | | | 1 | | | | | | | | | | | | | |
| 122 | | | | | | | | | | | | | | | | | | | | | | | | |
| 123 | | 4 | | | 54 | -70.000 | 50.000 | | 400 | 3 | | XY | G0 | | | | | | | | 43 | 3 | |
| 124 | | | | | | | | 50.000 | | 8 | | Z | G0 | | | | | | | | | | |
| 125 | | | | | | | -50.000 | -65.000 | | | 80 | Z | G0 | | | | 81 | 99 | -38.000 | | | | |
| 126 | | | | | | | | 50.000 | | 9 | | Z | G0 | | | | | | | | | | |
| 127 | | | | | | | | 50.000 | | 6 | | Z | G0 | | | | | | | | | | |
| 128 | | | 4 | | | | | FIRST ORIGIN | | 1 | | | | | | | | | | | | | |
| 129 | | | | | | | | | | | | | | | | | | | | | | | | |
| 130 | | 5 | | | | | | | | | | | | | | | | | | | | | | |
| 131 | | | | | 55 | 0 | -20.000 | | 300 | 3 | | XY | G0 | | | | | | | | 43 | 3 | |
| 132 | | | | | | | | 50.000 | | 8 | | Z | G0 | | | | | | | | | | |
| 133 | | | | | | | | -21.000 | | | 60 | Z | G1 | | | | 81 | 99 | 2.000 | | | | |
| 134 | | | | | | | | 50.000 | | 9 | | Z | G0 | | | | | | | | | | |
| 135 | | | | | | | | 50.000 | | 6 | | Z | G0 | | | | | | | | | | |
| 136 | | | 5 | | | | | FIRST ORIGIN | | 1 | | | | | | | | | | | | | |
| 137 | | | | | | | | | | | | | | | | | | | | | | | | |
| 138 | | 7 | | | 55 | 0 | -20.000 | | 310 | 3 | | XY | G0 | | | | | | | | 43 | 5 | |
| 139 | | | | | | | | 50.000 | | 8 | | Z | G0 | | | | | | | | | | |
| 140 | | | | | | | | -10.000 | | | 2000 | X | G1 | | 20.000 | | | | | | | | |
| 141 | | | | | -20.000 | | -20.000 | | | | 35 | X | G3 | | | | | | | | | | |
| 142 | | | | | | 0 | | | | | 50 | XY | G1 | | | | | | | 41 | | | |
| 143 | | | | | | | | 10.000 | | | | Z | G1 | | | | | | | 40 | | | |
| 144 | | | | | | | | | | 9 | | | | | | | | | | | | | |
| 145 | | | | | | | | | | 6 | | | | | | | | | | | | | |
| 146 | | | 7 | | | | | FIRST ORIGIN | | 1 | | | | | | | | | | | | | |
| 147 | | | | | | | | | | | | | | | | | | | | | | | | |
| 148 | | 8 | | | | | | | | | | | | | | | | | | | | | | |
| 149 | | | | | 55 | 0 | -20.000 | | 1000 | 3 | | XY | G0 | | | | | | | | 43 | 7 | 5 |
| 150 | | | | | | | | 50.000 | | 8 | | Z | G0 | | | | | | | | | | |
| 151 | | | | | | | | -45.000 | | | 150 | Z | G0 | | | | 81 | 98 | -19.000 | | | | |
| 152 | | | | | | | | 50.000 | | 9 | | Z | G0 | | | | | | | | | | |
| 153 | | | 8 | | | | | FIRST ORIGIN | | 6 | | Z | G0 | | | | | | | | | | |

| LINE NO. | O | N | NT | ST | WK | X COORDINATE | Y COORDINATE | Z COORDINATE | S | M | F | AXIS | INTER-POLATION | R | I | J | G80 | G98 | R POINT | G40 | G43 | H | D |
|---|---|---|---|---|---|---|---|---|---|---|---|---|---|---|---|---|---|---|---|---|---|---|---|
| 154 |   |   |   |   |   |   |   |   |   | 1 |   |   |   |   |   |   |   |   |   |   |   |   |   |
| 155 | 9 |   |   |   |   |   |   |   |   |   |   |   |   |   |   |   |   |   |   |   |   |   |   |
| 156 |   |   | 9 |   | 54 | -70.000 | 50.000 |   | 500 | 3 |   |   |   |   |   |   |   |   |   |   |   |   |   |
| 157 |   |   |   |   |   |   |   | 10.000 |   | 8 |   | XY | G0 |   |   |   |   |   |   |   |   |   |   |
| 158 |   |   |   |   |   |   |   | -51.000 |   |   | 50 | Z | G0 |   |   |   | 81 | 98 | -48.000 |   | 43 | 8 |   |
| 159 |   |   |   |   |   |   | -50.000 |   |   |   |   | Z |   |   |   |   |   |   |   |   |   |   |   |
| 160 |   |   |   |   |   |   |   | 100.000 | 800 |   |   | Z | G0 |   |   |   |   |   |   |   |   |   |   |
| 161 |   |   |   |   | 55 | 0 | -20.000 |   |   |   |   | Z | G0 |   |   |   |   |   |   |   |   |   |   |
| 162 |   |   |   |   |   |   |   | 10.000 |   |   |   | XY | G0 |   |   |   |   |   |   |   |   |   |   |
| 163 |   |   |   |   |   |   |   | -25.000 |   | 9 |   | Z | G0 |   |   |   | 81 | 98 | -22.000 |   |   |   |   |
| 164 |   |   |   |   |   |   |   | 50.000 |   | 6 | 80 | Z |   |   |   |   |   |   |   |   |   |   |   |
| 165 |   |   |   | 9 |   |   |   | FIRST ORIGIN |   | 1 |   |   |   |   |   |   |   |   |   |   |   |   |   |
| 166 |   |   |   |   |   |   |   |   |   |   |   |   |   |   |   |   |   |   |   |   |   |   |   |
| 167 |   | 10 |   |   |   |   |   |   |   |   |   |   |   |   |   |   |   |   |   |   |   |   |   |
| 168 |   |   | 1 |   | 55 | 0 | -20.000 |   |   | 8 |   | XY | G0 |   |   |   |   |   |   |   |   |   |   |
| 169 |   |   |   |   |   |   |   | 10.000 | 320 | 29 |   | Z | G0 |   |   |   | 84 | 98 | -10.000 |   | 43 | 9 |   |
| 170 |   |   |   |   |   |   |   |   |   |   | 400 | Z |   |   |   |   |   |   |   |   |   |   |   |
| 171 |   |   |   |   |   |   |   | -40.000 |   | 9 |   | Z | G0 |   |   |   |   |   |   |   |   |   |   |
| 172 |   |   |   |   |   |   |   | 50.000 |   | 6 |   | Z | G0 |   |   |   |   |   |   |   |   |   |   |
| 173 |   |   |   | 1 |   |   | 0 | FIRST ORIGIN |   | 30 |   | YZ |   |   |   |   |   |   |   |   |   |   |   |
| 174 |   |   |   |   |   |   |   |   |   |   |   |   |   |   |   |   |   |   |   |   |   |   |   |

Fig. 7E

CUTTING CONDITION DATABASE

F1: FEED PER TOOTH  W: WIDTH OF CUT
F2: FEED PER REVOLUTION  H: DEPTH OF CUT
CUTTING EDGE POINT: NO. OF COLLISION WITH WORK
E.Ang.: CUTTING START ANGLE
DE.Ang.: CUTTING END ANGLE

| CUTTING CONDITION NO. | WORK ELEMENT | WORK MATERIAL | TOOL NO. | CUTTING SPEED | F1 | F2 | W | H | CUTTING EDGE POINT 1 | CUTTING EDGE POINT 2 | CUTTING EDGE POINT 3 | CUTTING EDGE POINT 4 | CUTTING EDGE POINT 5 | CUTTING TIME | CUTTING DISTANCE | E.Ang | DE.Ang. |
|---|---|---|---|---|---|---|---|---|---|---|---|---|---|---|---|---|---|
| 1 | FACING ROUGHING | FC | 1 | 126 | 0.10 | - | 80.0 | 4.9 | 10020 | 10254 | 10280 | 10281 | 8245 | 0:10:25 | 50.012 | | |
| 2 | CENTERING | FC | 2 | 9 | - | 0.10 | - | - | 10425 | 10245 | 10341 | 15420 | 11024 | 0:03:20 | 25.213 | | |
| 3 | DRILLING | FC | 3 | 25 | - | 0.20 | - | - | 30124 | 32514 | 36544 | 32120 | 32120 | 0:05:58 | 40.365 | | |
| 4 | DRILLING | FC | 4 | 28 | - | 0.20 | - | - | 10452 | 10245 | 14210 | 12452 | 10342 | 0:06:30 | 25.542 | | |
| 5 | POCKET ROUGHING | FC | 5 | 24 | 0.08 | 0.16 | 25.0 | 19.9 | 22101 | 22321 | 22314 | 21000 | 18754 | 0:20:31 | 60.842 | | |
| 6 | POCKET FINISHING | FC | 6 | 31 | 0.10 | 0.10 | 0.1 | 0.1 | 10245 | 12221 | 13212 | 12121 | 74545 | 0:35:03 | 96.998 | | |
| 7 | DRILLING | FC | 7 | 26 | - | 0.15 | - | - | 36452 | 36412 | 36412 | 36545 | 32565 | 0:03:56 | 5.774 | | |
| 8 | CHAMFERING | FC | 8 | 23 | - | 0.10 | - | - | 12451 | 12451 | 12451 | 12451 | 8456 | 0:07:21 | 15.445 | | |
| 9 | TAPPING | FC | 9 | 10 | - | - | - | - | 22541 | 22654 | 22142 | 15412 | 120 | 0:15:41 | 27.649 | | |

Fig. 8A

CUTTING CONDITION ANALYSIS DATA

F1: FEED PER TOOTH  W: WIDTH OF CUT  E: Ang.: CUTTING START ANGLE
F2: FEED PER REVOLUTION  H: DEPTH OF CUT  DE. Ang.: CUTTING END ANGLE
CUTTING EDGE POINT: NO. OF COLLISION WITH WORK

| CUTTING CONDITION NO. | WORK ELEMENT | WORK MATERIAL | TOOL NO. | CUTTING SPEED | F1 | F2 | W | H | CUTTING EDGE POINT 1 | CUTTING EDGE POINT 2 | CUTTING EDGE POINT 3 | CUTTING EDGE POINT 4 | CUTTING EDGE POINT 5 | CUTTING TIME | CUTTING DISTANCE | E.Ang | DE.Ang |
|---|---|---|---|---|---|---|---|---|---|---|---|---|---|---|---|---|---|
| 10 | FACING ROUGHING | FC | 1 | 126 | 0.10 | - | 80.0 | 2.5 | | | | | | | | | |
| 11 | FACING FINISHING | FC | 1 | 188 | 0.11 | - | 80.0 | 0.1 | | | | | | | | | |
| 12 | SIDE ROUGHING | FC | 5 | 24 | 0.15 | 0.29 | 12.5 | 15.0 | | | | | | | | | |
| 13 | SIDE FINISHING | FC | 6 | 31 | 0.11 | 0.23 | 0.2 | 0.2 | | | | | | | | | |
| 14 | CENTER DRILLING | FC | 2 | 9 | - | 0.10 | - | - | | | | | | | | | |
| 15 | DRILLING | FC | 3 | 25 | - | 0.20 | - | - | | | | | | | | | |
| 16 | DRILLING | FC | 4 | 28 | - | 0.20 | - | - | | | | | | | | | |
| 17 | ROCKET ROUGHING | FC | 5 | 24 | 0.08 | 0.16 | 5.0 | 20.0 | | | | | | | | | |
| 18 | DRILLING | FC | 7 | 26 | - | 0.15 | - | - | | | | | | | | | |
| 19 | CHAMFERING | FC | 8 | 33 | - | 0.10 | - | - | | | | | | | | | |
| 20 | CHAMFERING | FC | 8 | 23 | - | 0.10 | - | - | | | | | | | | | |
| 21 | TAPPING | FC | 9 | 10 | - | - | - | - | | | | | | | | | |

Fig. 8B

OPTIMIZTION BY TIME PRIORITY SAMPLE NC PROGRAM

| | | | |
|---|---|---|---|
| | | 034 | G2 X-70.652 Y95.5 R125. F90 |
| | | 035 | G0 X90.652 |
| 001 | O 0002 | 036 | G2 X115.5 Y67.043 R125. |
| 002 | G90 G80 G40 | 037 | G0 Y67.043 |
| 003 | G91 G28 Z0 | 038 | G22 X90.652 Y-95.5 R125. |
| 004 | T1 | 039 | G0 X-49.464 |
| 005 | M6 | 040 | G2 Y95.5 R112.5 |
| 006 | N1(FACE MILL 100mm DIA.) | 041 | G2 Y69.464 |
| 007 | G90 G55 G0 X160. Y50. S400 M3 T5 | 042 | G2 X115.5 Y39.064 R112.5 |
| 008 | G43 Z50. H1 M8 | 043 | G0 Y-39.064 |
| 009 | Z.1 | 044 | G2 X69.464 Y-95.5 R112-.5 |
| 010 | G1 X-160. F250 | 045 | G0 X-19.661 |
| 011 | G0 Y-45. | 046 | G2 Y95.5 R100. |
| 012 | G1 X160. | 047 | G0 X39.661 |
| 013 | G0 Y50. Z0 S600 | 048 | G2 Y-95.5 R100. |
| 014 | G1 X-160. F400 | 049 | G0 X27.5 Y-105. |
| 015 | G0 Y-45. | 050 | G3 X10. Y-87.5 R17.5 |
| 016 | G1 X160. | 051 | G2 J87.5 |
| 017 | G0 Z100. | 052 | G1 X27.5 Y-90.2 |
| 018 | G54 G0 X160. Y50. S400 | 053 | G3 X10. Y-72.7 R17.5 |
| 019 | Z.1 | 054 | G2 J72.7 |
| 020 | G1 X-160.F250 | 055 | G0 Z10. |
| 021 | G0 Y-45. | 056 | Y-125. |
| 022 | G1 X160. | 057 | Z-39.8 |
| 023 | G0 Y50. Z0 S600 | 058 | G2 X-70.652 Y95.5 R125. |
| 024 | G1 X-160. F400 | 059 | G0 X90.652 |
| 025 | G0 Y-45. | 060 | G2 X115.5 Y67.043 R125. |
| 026 | G1 X160. | 061 | G0 Y-67.043 |
| 027 | G0 Z50. M9 | 062 | G2 X115.5 Y67.043 R125. |
| 028 | G91 G28 Z0 M6 | 063 | G0 X-49.464 |
| 029 | M1 | 064 | G2 Y95.5 R112.5 |
| 030 | NS(END MILL 25mm DIR ROUGH) | 065 | G0 X69.464 |
| 031 | G90 G54 G0 X-61.545 Y-102.5 S310 M3 T6 | 066 | G2 X115.5 Y39.064 R112.5 |
| | | 067 | G0 Y-39.064 |
| 032 | G43 Z50. H5 M8 | 068 | G2 X69.464 Y-95.5 R112.5 |
| 033 | Z-19.9 | 069 | G0 X-19.661 |

Fig. 9A

| | | | |
|---|---|---|---|
| 070 | G2 Y95.5 R100. | 105 | G41 G1 X40.Y-90.D6 |
| 071 | G0 X39.661 | 106 | G3 X10. Y-60. R30 |
| 072 | G2 Y-95.5 R100. | 107 | G2 J60. |
| 073 | G0 X27.5 Y-105. | 108 | G3 X-20. Y-90. R30. |
| 074 | G3 X10. Y-87.5 R17.5 | 109 | G40 G1 X0 |
| 075 | G2 J87.5 | 110 | G0 Z50. M9 |
| 076 | G1 X27.5 Y-90.2 | 111 | G91 G28 Z0 M6 |
| 077 | G3 X10. Y-72.7 R17.5 | 112 | M1 |
| 078 | G2 J72.7 | 113 | N4(CENTER DRILL) |
| 079 | G0 Z10. M9 | 114 | G90 G54 G0 X-70. Y50. S1000 M3 T4 |
| 080 | G91 G28 Z0 M6 | 115 | G43 Z50. H2 M8 |
| 081 | M1 | 116 | G99 G81 Z-43. R-38. F100 |
| 082 | N3(END MILL 25mm DIR FINISH) | 117 | Y-50. |
| 083 | G90 G54 G0 X-61.545 Y-102.5 S400 M3 T2 | 118 | G0 Z100. |
| | | 119 | G90 G55 G0 X0 Y-20. |
| 084 | G43 Z50. H6 M8 | 120 | Z50. |
| 085 | Z-40. | 121 | G99 G81 Z-3. R2. F100. |
| 086 | G2 X-70.652 Y95.5 R125. F110 | 122 | G0 Z50. M9 |
| 087 | G0 X90.652 | 123 | G91 G28 Z0 M6 |
| 088 | G2 X115.5 Y67.043 R125. | 124 | M1 |
| 089 | G0 Y-67.0473 | 125 | N5(DRILL 30mm DIA.) |
| 090 | G2 X90.652 Y-95.5 R125. | 126 | G90 G55 G0 X0 Y-20. S300 M3 T5 |
| 091 | G0 X-49.464 | 127 | G43 Z50. H4 M8 |
| 092 | G2 95.5 R1125.5 | 128 | G99 G81 Z-21. R2. F60 |
| 093 | G0 X69.464 | 129 | G0 Z50. M9 |
| 094 | G2 X115.5 Y39.064 R112.5 | 130 | G91 G28 Z0 M6 |
| 095 | G0 X39.064 | 131 | M1 |
| 096 | G2 X69.464 Y-95.5 R112.5 | 132 | N6(END MILL 25mm DIR ROUGH) |
| 097 | G0 X-19.661 | 133 | G90 G55 G0 X0 Y-20. S310 M3 T7 |
| 098 | G2 Y95.5 R100. | 134 | G43 Z50. H5 M8 |
| 099 | G0 X69.661 | 135 | G1 Z-10. F2000 |
| 100 | G2 Y-95.5 R100. | 136 | Z-20. F35 |
| 101 | G0 X27.5 Y-105. | 137 | G41 X-20. F35 |
| 102 | G3 X10. Y87.5 R17.5 | 138 | G3 I20. F50 |
| 103 | G2 J87.5 | 139 | G40 G1 X0 |
| 104 | G3 X-7.5 Y-105. R17.5 | 140 | G0 Z10. M9 |

Fig. 9B

| | | | |
|---|---|---|---|
| 141 | G91 G28 Z0 M6 | 177 | M30 |
| 142 | M1 | | |
| 143 | N7(DRILL 8.2mm) | | |
| 144 | G90 G55 G0 X0 Y-20 S1000 M3 T3 | | |
| 145 | G43 Z50. H7 M8 | | |
| 146 | G98 G81 Z-45. R-19. F150 | | |
| 147 | G0 Z50. M9 | | |
| 148 | G91 G28 Z0 M6 | | |
| 149 | M1 | | |
| 150 | N8(DRILL 20mm DIA.) | | |
| 151 | G90 G54 G0 X-70. Y50. S400 M3 T8 | | |
| 152 | G43 Z50. H3 M8 | | |
| 153 | G99 G81 Z-65. R-38. F80 | | |
| 154 | Y-50. | | |
| 155 | G0 Z50. M9 | | |
| 156 | G91 G28 Z0 M6 | | |
| 157 | M1 | | |
| 158 | N9(CHAMFER 25mm DIA.) | | |
| 159 | G90 G54 G0 Z-70. Y50. S500 M3 T9 | | |
| 160 | G43 Z10. H8 M8 | | |
| 161 | G98 G81 Z-50. R-48. F50 | | |
| 162 | Y-50. | | |
| 163 | G0 Z100. | | |
| 164 | G90 G55 G0 X0 Y-20. S800 | | |
| 165 | Z10. | | |
| 166 | G98 G81 Z-25. R-22. F80 | | |
| 167 | G0 Z50. M9 | | |
| 168 | G91 G28 Z0 M6 | | |
| 169 | M1 | | |
| 170 | N10(TAP M10 P1.25) | | |
| 171 | G90 G55 G0 X0 Y-20. T1 | | |
| 172 | G43 Z10. H9 M8 | | |
| 173 | M29 S320 | | |
| 174 | G98 G84 Z-40. R-10. F400 | | |
| 175 | G0 Z50. M9 | | |
| 176 | G91 G28 Y0 Z0 M6 | | |

Fig. 9C

| MACHINING ELEMENT | NUMBER OF TOOL USED |
|---|---|
| FACING | 1 |
| CIRCLE SIDE MACHINING | 5  6 |
| 20 mm DIA. DRILLING | 2  3  8 |
| M10 TAPPING | 2  4  5  7  8  9 |

| MACHINING SURFACE | TOOL NUMBER |
|---|---|
| G54 G55 | 1 |
| G54 | 5 |
| 〃 | 6 |
| 〃 | 2 |
| G55 | |
| G54 | 3 |
| G55 | 4 |
| 〃 | 5 |
| 〃 | 7 |
| G54 G55 | 8 |
| 〃 | 9 |

Fig. 12A

| MACHINING SURFACE | TOOL NUMBER |
|---|---|
| G54 G55 | 1 |
| G54 | 5 |
| 〃 | 6 |
| 〃 | 2 |
| G55 | |
| G54 | 3 |
| G55 | 4 |
| 〃 | 5 |
| 〃 | 7 |
| G54 G55 | 8 |
| 〃 | 9 |

Fig. 12B

| MACHINING SURFACE | TOOL NUMBER |
|---|---|
| G55 G54 | 1 |
| ″ | 5 |
| ″ | 6 |
| ″ G55 | 2 |
| ″ | 3 |
| ″ | 4 |
| ″ | 5 |
| G54 | 7 |
| ″ G55 | 8 |
| ″ | 9 |

Fig. 12C

| MACHINING SURFACE | TOOL NUMBER |
|---|---|
| G54 | 1 |
| ″ | 5 |
| ″ | 6 |
| ″ | 2 |
| ″ | 3 |
| ″ | 8 |
| G55 | 1 |
| ″ | 2 |
| ″ | 4 |
| ″ | 5 |
| ″ | 7 |
| ″ | 8 |
| ″ | 9 |

Fig. 12D

OPTIMIZTION BY PRECISION PRIORITY SAMPLE NC PROGRAM

| | | | | |
|---|---|---|---|---|
| | | | 035 | G0 Z10. |
| | | | 036 | Y-125. |
| 001 | O 0003 | | 037 | Z-39.8 |
| 002 | G90 G80 G40 | | 038 | G2 J125.F 90 |
| 003 | G91 G28 Z0 | | 039 | G0 Y-112.5 |
| 004 | T1 | | 040 | G2 J112.5 |
| 005 | M6 | | 041 | G0 Y-100. |
| 006 | N1(FACE MILL 100mm DIA.) | | 042 | G2 J100. |
| 007 | G90 G54 G0 X160. Y50. S400 M3 T5 | | 043 | G0 X27.5 Y-105. |
| 008 | G43 Z50. H1 M8 | | 044 | G3 X10. Y-87.5 R17.5 |
| 009 | Z.1 | | 045 | G2 J87.5 |
| 010 | G1 X-160. F250 | | 046 | G1 X27.5 Y-90.2 |
| 011 | G0 Y-45. | | 047 | G3 X10. Y-727.7 R17.5 |
| 012 | G1 X160. | | 048 | G2 J72.7 |
| 013 | G0 Y50. Z0 S600 | | 049 | G0 Z10. M9 |
| 014 | G1 X-160. F400 | | 050 | G91 G28 Z0 M6 |
| 015 | G0 Y-45. | | 051 | M1 |
| 016 | G1 X160. | | 052 | N3(END MILL 25mm DIR FINISH) |
| 017 | G0 Z50. M9 | | 053 | G90 G54 G0 X10. Y-125. S400 M3 T2 |
| 018 | G91 G28 Z0 M6 | | 054 | G43 Z50. H6 M8 |
| 019 | M1 | | 055 | Z-40. |
| 020 | N2(END MILL 25mm DIR ROUGH) | | 056 | G2 J125. F110 |
| 021 | G90 G54 G0 X10. Y-125.S 310 M3 T6 | | 057 | G0 Y-112.5 |
| 022 | G43 Z50. H5 M8 | | 058 | G2 J112.5 |
| 023 | Z-19.9 | | 059 | G0 Y-100. |
| 024 | G2 J125. F90 | | 060 | G2 J100. |
| 025 | G0 Y-112.5 | | 061 | G0 X27.5 Y-105. |
| 026 | G2 J112.5 | | 062 | G3 X10. Y-87.5 R17.5 |
| 027 | G0 Y-100. | | 063 | G2 J87.5 |
| 028 | G2 J100. | | 064 | G3 X-7.5 Y-105. R17.5 |
| 029 | G0 X27.5 Y-105. | | 065 | G41 G1 X40. Y-90.D6 |
| 030 | G3 X10. Y-87.5 R17.5 | | 066 | G3 X10. Y-60 R30 |
| 031 | G2 J87.5 | | 067 | G2 J60. |
| 032 | G1 X27.5 Y-90.2 | | 068 | G3 X-20. Y-90. R30 |
| 033 | G3 X10. Y-727.7 R17.5 | | 069 | G40 G1 X0 |
| 034 | G2 J72.7 | | 070 | G0 Z50. M9 |

Fig. 13A

| | | | |
|---|---|---|---|
| 071 | H91 G28 Z0 M6 | 107 | G1 X160. |
| 072 | M1 | 108 | G0 Z50. M9 |
| 073 | N4(CENTER DRILL) | 109 | G91 G28 Z0 M6 |
| 074 | G90 G54 G0 X-70. Y50. S1000 M3 T3 | 110 | M1 |
| 075 | G43 Z50. H2 M8 | 111 | 114(CENTER DRILL) |
| 076 | G99 G81 Z-40. R-38. F100 | 112 | G90 G55 G0 X0 Y-20. S1000 M3 T3 |
| 077 | Y-50. | 113 | G43 Z50. H2 M8 |
| 078 | G0 Z50. M9 | 114 | G99 G81 Z-30. R2. F100 |
| 079 | G91 G28 Z0 M6 | 115 | G0 Z50. M9 |
| 080 | M1 | 116 | G91 G28 Z0 M6 |
| 081 | N5(DRILL 20mm DIA.) | 117 | M1 |
| 082 | G90 G54 G0 X-70. Y50. S400 M3 T4 | 118 | N6(DRILL 30mm DIA.) |
| 083 | G43 Z50. G3 M8 | 119 | G90 G55 G0 X0 Y-20. S300 M3 T5 |
| 084 | G99 G81 Z-65. R-38. F80 | 120 | G43 Z50. H4 M8 |
| 085 | Y-50. | 121 | G99 G81 Z-21. F60 |
| 086 | G0 Z50. M9 | 122 | G0 Z50. M9 |
| 087 | G91 G28 Z0 M6 | 123 | G91 G28 Z0 M6 |
| 088 | M1 | 124 | M1 |
| 089 | NP(CHAMFER 25mm DIA.) | 125 | N7(END MILL 25mm DIR ROUGH) |
| 090 | G90 G54 G0 X-70. Y50 S350 M3 T9 | 126 | G90 G55 G0 X0 Y-20. S310 M3 T7 |
| 091 | G43 Z10. H8 M8 | 127 | G43 Z50. H5 M8 |
| 092 | G98 G81 Z-51. R-48. F50 | 128 | G1 Z-10. F2000 |
| 093 | Y-50. | 129 | Z-20. F35 |
| 094 | G0 Z50. M9 | 130 | G41 X-20. D5 |
| 095 | G91 G28 Z0 M6 | 131 | G3 I20. F50 |
| 096 | M1 | 132 | G40 G1 X0 |
| 097 | N1(FACE MILL 100mm DIA.) | 133 | G0 Z10. M9 |
| 098 | G90 G55 G0 X160. Y50. S400 M3 T5 | 134 | G91 G28 Z0 M6 |
| 099 | G43 Z50. H1 M8 | 135 | M1 |
| 100 | Z.1 | 136 | N8(DRILL 8.2mm) |
| 101 | G1 X-160. F250 | 137 | G90 G55 G0 X0 Y-20 S1000 M3 T8 |
| 102 | G0 Y-45. | 138 | G43 Z50. H7 M8 |
| 103 | G1 X160 | 139 | G98 G81 Z-45. R-19. F150 |
| 104 | G0 Y50. Z0 S600 | 140 | G0 Z50. M9 |
| 105 | G1 X-160. F400 | 141 | G91 G28 Z0 M6 |
| 106 | G0 Y-45. | 142 | M1 |

Fig. 13B

| | |
|---|---|
| 143 | N9(CHAMFER 25mm DIA.) |
| 144 | G90 G55 G0 X0 Y-20.0S800 M3 T9 |
| 145 | G43 Z10. H8 M8 |
| 146 | G98 G81 Z-25. R-22. F80 |
| 147 | G0 Z50. M9 |
| 148 | G91 G28 Z0 M6 |
| 149 | M1 |
| 150 | N10(TAP M10 P1.25) |
| 151 | G90 G55 G0 X0 Y-20. T1 |
| 152 | G43 Z10. H9 M8 |
| 153 | M29 S320 |
| 154 | G98 G84 Z-40.0 R-10. F400 |
| 155 | G0 Z50. M9 |
| 156 | G91 G28 Y0 Z0 M6 |
| 157 | M30 |

Fig. 13C

OPTIMIZATION METHOD AND DEVICE OF NC PROGRAM IN NC MACHINING

TECHNICAL FIELD

The present invention relates to an optimization method and device of an NC program in NC machining, and more particularly to an optimization method and device of an NC program which extract various machining information or machining conditions from the NC program used for actual machining in the NC machining which performs various machining control using numerical control information, and, if this machining information or machining conditions are not optimum, to those which optimize an NC program based on the already-stored machining information or machining conditions, extract the machining information or machining conditions of this optimized actual machining program and can store this machining information in the numerically-controlled machine tool as general-purpose information or in other numerically-controlled machine tools as widely usable information.

BACKGROUND ART

Usually, unique information such as a tool indexing command, a spindle speed of revolution command, a feedrate command, a move/interpolation command and a miscellaneous function command and machining histories are built in as numerical control information such as NC programs, and the numerical control information which is a target of machining control and is suitable for a machine tool is created as an NC program each time.

The conventional numerical control information was created as a desired NC program using CAD (computer-aided design)/CAM (computer-aided manufacturing) or an automatic programming tool by assigning base material data and the final component shape. This program was eventually used in the machining control of a machine tool as an actual machining NC program by making adjustments (modification and editing) of the NC program in the field and repeating a simulation or test cut in a practical machine tool.

Thus, in a conventional NC machining system, the work at the time when numerical control information was corrected and edited was not used repeatedly, fed back or stored and made usable as know-how (technical knowledge).

To resolve this problem, such art as PCT/JP96/03264 has been researched into and developed. This art analyzes numerical control information, in particularly, an actual machining NC program whose modification and editing had been completed, and inversely extracts various machining conditions of field know-how and other various machining conditions, that is, the optimum machining information or machining conditions for specific work from the actual machining NC program which is finally used for quantity production machining in the field, and can use these machining information or machining conditions as databases. Consequently, an optimum field machining program can instantaneously be programmed automatically from these fed back databases.

Thus, in the prior art described above, the various machining information or machining conditions of an analyzed actual machining NC program can be put on the database as know-how. However, some actual machining NC programs include even an actual machining NC program whose modification and editing are completed but which is not optimum with the change of the times, an actual machining NC program in which even the same tool whose cutting conditions are not optimum due to improvements of a tool and a chip or an actual machining NC program in which whether its modification and editing are completed is unknown. Accordingly, if these actual machining NC programs are analyzed and their machining information or machining conditions are added to databases as they are, there was a problem that the databases are not optimized.

The present invention is directed toward such an issue, and an object of the present invention is to optimize an actual machining NC program even if the machining information or machining conditions of the actual machining NC program are not optimum, and to enable the machining information or machining conditions of this optimized actual machining NC program to be used as databases.

DISCLOSURE OF THE INVENTION

The present invention, in NC machining in which machining control is performed through an NC program, comprises a machining method analyzer which analyses the NC program and extracts machining information or machining conditions, a storage device which stores the machining information or machining conditions so as to be able to be rewritten and an NC program optimization device which optimizes the NC program based on the existing machining conditions stored in the storage device.

Further, the present invention comprises a mode switching device by which the NC program optimization device switches an optimization mode which optimizes the NC program based on the existing machining conditions stored in the storage device and an analytic storage mode which stores the machining conditions extracted by the machining method analyzer, in the storage device.

Furthermore, the present invention enables the NC program optimization device to optimize the NC program to a plurality of patterns based on the existing machining conditions stored in the storage device.

Moreover, the present invention enables the NC program optimization device to select an optimizing condition from a plurality of patterns based on the existing machining conditions stored in the storage device before the NC program is optimized.

Further, the present invention, in NC machining in which machining control is performed through an NC program, comprises a machining method analyzing step which analyzes the NC program and extracts machining information or machining conditions, a storage step which stores the machining conditions so that they can be rewritten and an NC program optimization step which optimizes the NC program based on the existing machining conditions stored according to the storage step.

Furthermore, the present invention comprises a mode switching step at which the NC program optimization step switches an optimization mode which optimizes the NC program based on the existing machining conditions stored according to the storage step and an analytic storage mode which stores the machining conditions extracted according to the machining method analyzing step.

Moreover, the present invention enables the NC program optimization step to optimize the NC program to a plurality of patterns based on the existing machining conditions stored according to the storage step.

Further, the present invention enables the NC program optimization step to select an optimizing condition from a plurality of patterns based on the existing machining conditions stored according to the storage step before the NC program is optimized.

As described above, according to an NC machining system related to the present invention, if the machining conditions of an actual machining NC program are not optimum, the machining method of the actual machining NC program is analyzed and the actual machining NC program can be optimized based on the existing data of a database. Then, because the machining conditions of this optimized actual machining NC program are extracted and can be put on the database, the machining conditions which are put on the database are only optimum data, and the machining conditions of the database can always be maintained in an optimized condition.

BRIEF DESCRIPTION OF DRAWINGS

FIG. 3A, FIG. 3B or FIG. 3C is a diagram showing an example of an actual machining NC program used in an embodiment of the present invention;

FIG. 4 is a diagram showing a base material shape used in this embodiment;

FIG. 5 is a diagram showing the final machining shape used in this embodiment;

FIG. 6 is a diagram showing a tool list used in this embodiment;

FIG. 7A, FIG. 7B, FIG. 7C, FIG. 7D or FIG. 7E is a diagram showing a G code expansion list guided from a actual machining NC program in this embodiment;

FIG. 8A is an illustration showing an example in which the machining conditions for each work element machining in this embodiment are presented as cutting condition databases;

FIG. 8B is an illustration showing the cutting condition analysis data guided from an actual machining NC program in this embodiment;

FIG. 9A, FIG. 9B or FIG. 9C is a diagram showing a result in which optimization by time priority is executed for an example of the actual machining NC program used in an embodiment of the present invention;

FIG. 12A is a diagram showing the surface indexing of an actual machining NC program used in an embodiment of the present invention and a tool change list;

FIG. 12B is a diagram showing the surface indexing of an actual machining NC program used in an embodiment of the present invention and an intermediate state of the time-priority optimization of a tool change list;

FIG. 12C is a diagram showing a result in which the surface indexing of an actual machining NC program used in an embodiment of the present invention and the time-priority optimization of a tool change list were executed;

FIG. 12D is a diagram showing a result in which the surface indexing of an actual machining NC program used in an embodiment of the present invention and the precision-priority optimization of a tool change list were executed; and FIG. 13A, FIG. 13B or FIG. 13C is a diagram showing a result in which precision-priority optimization was executed for an example of an actual machining NC program used in an embodiment of the present invention.

BEST MODE FOR CARRYING OUT THE INVENTION

In accordance with the diagrams, preferred embodiments of the present invention are described in detail below.

Figure 1:
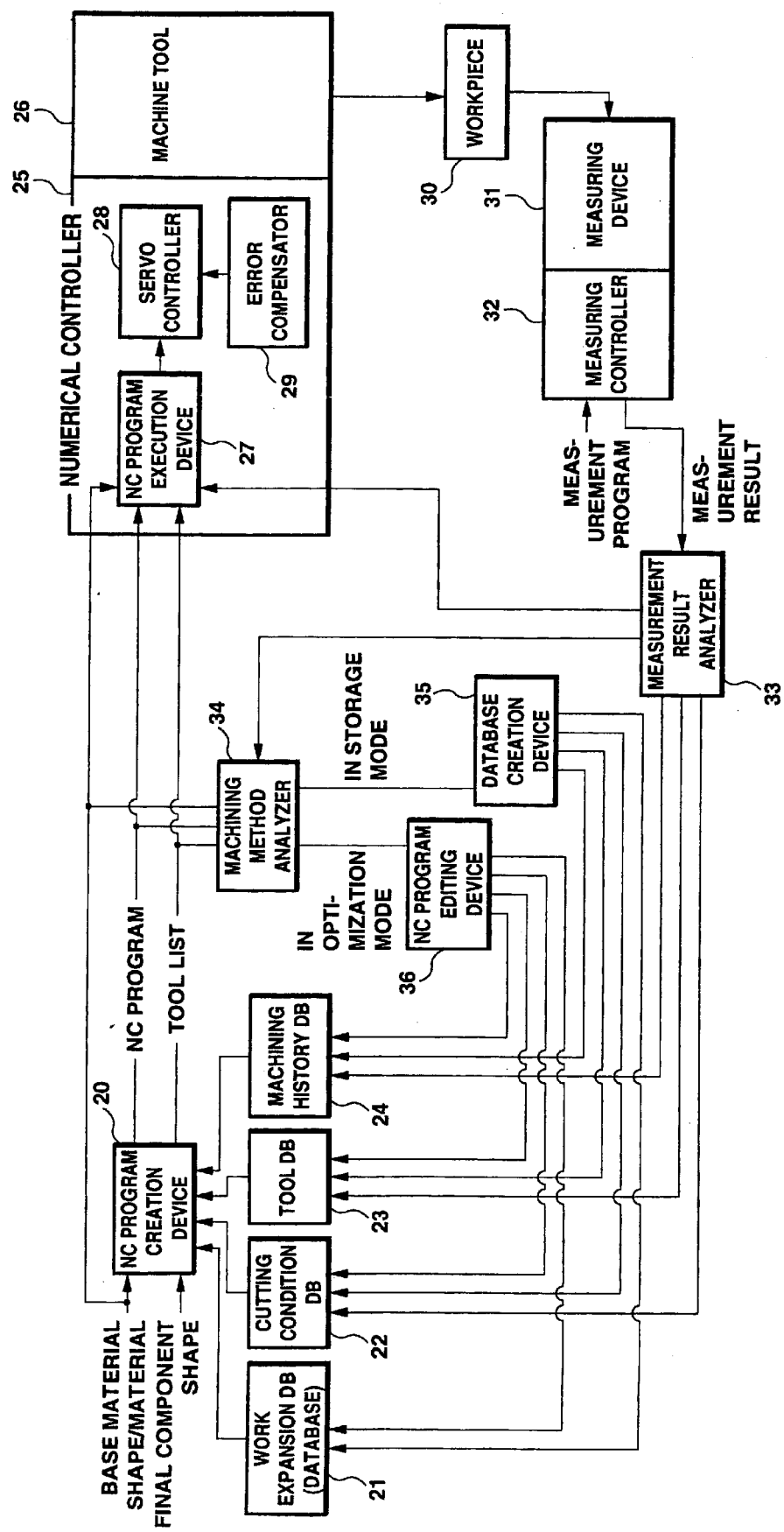
FIG. 1 is a block diagram showing the overall configuration of a numerically controlled system in which an NC optimization method and device related to the present invention are built.

FIG. 1 shows the overall configuration of a numerically controlled machine tool system to which an optimization method and device of an NC program related to the present invention were applied.

In the same manner as before, an NC program is created by assigning base material data and the final component shape. In the diagram, the base material data includes a base material shape and a material. An NC program creation device 20 creates a desired NC program by adding know-how data stored in the past which is assigned from various databases to the input base material data and final component shape. In the embodiment, databases comprise a work expansion database 21, a cutting condition database 22, a tool database 23 and a machining history database 24, and past field know-how, other conditions required for practical machining and conditions peculiar to a machine tool used are supplied from each of these databases to the NC program creation device 20 as reference data to create an NC program.

The NC program created as described above and a tool list are sent to a numerical controller 25 and necessary idle operation and a test cut or simulation are performed, which is completed as an actual machining NC program finally used in the field of the numerical controller 25 via the same NC program modification and editing as before. The modification and editing portion of such an NC program is not shown in FIG. 1 in detail.

The numerical controller 25 includes an NC program execution device 27, a servo controller 28 and an error compensator 29 to drive a machine tool 26, and the NC program, tool list and base material data are input to the NC program execution device 27 respectively. The NC program execution device 27, referring to the measurement result described later, performs interpolation processing based on an appropriate feedrate according to each of the input data to supply a servo control signal to the servo controller 28 and enables feed drive control of the machine tool 26 conforming to an NC program by an output drive signal of the servo controller 28. The error compensator 29 is installed to compensate for position or dimensional errors caused by temperature changes of the machine tool 26 and can compensate for the errors resulting from temperatures using the output of a measuring device installed in the machine tool 26.

Thus, the machine tool 26 executes desired work element machining, machining of an element to be machined and process machining for a workpiece 30 loaded on a table in accordance with an NC program, and completes machining in the first attitude of the workpiece 30.

When the process machining of the workpiece 30 is completed according to the first attitude, a measuring device 31 measures the coordinates of the workpiece 30 in accordance with the measurement program of a measuring controller 32. This measurement result is fed back to the NC program execution device 27 of the numerical controller 25 and a machining method analyzer 34 via a measurement result analyzer 33, and as occasion demands, this measurement result is supplied to each of the databases 22, 23 and 24. Thus, according to the embodiment shown, desired numerically controlled machining can be applied to the workpiece 30 based on the created NC program. Then, the attitude of the workpiece 30 is switched after the process machining in the first attitude has been completed and the machining which conforms to the NC program is continuously performed in the second attitude in the same manner as above.

In the conventional PCT application art described previously, the contents of an actual machining NC program which is executed in the numerical controller 25 are appropriately analyzed and machining information such as machining know-how included in this NC program is extracted, and this extracted machining information can be stored so that it can be rewritten. The machining information is extracted from the analysis result of the NC program as the machining conditions for each work element machining and these machining conditions are stored in a storage device corresponding to each work element machining.

According to an optimization method and device of an NC program related to the present invention, in addition to the analytic storage of machining information in the prior art, if such machining conditions for each work element machining cannot be introduced as they are, they are supplied to various databases by executing new optimization processing further.

In the present invention, such two types of machining condition extraction storage are handled as an analytic storage mode for the former and as an optimization mode for he latter.

First, the optimization of an NC program disclosed in a conventional PCT application art and introduced as the analytic storage mode of the present invention is described.

In FIG. 1, a machining program, a tool list and a measurement result are supplied to the machining method analyzer 34 and necessary machining information is extracted in accordance with predetermined algorithms. Then, such extracted machining information is supplied to a database creation device 35 and the machining information classified by item is written to and stored in each database described previously, that is, the work expansion database 21, the cutting condition database 22, the tool database 23 and the machining history database 24 as the machining conditions which correspond to each work element machining.

Accordingly, after the actual machining of the workpiece has been performed by the machine tool 26, each of the databases 21 to 24 ordinarily introduces the machining information such as field know-how reflected in this actual machining and the contents of the database can be updated. These contents can be reflected in current machining and usually the machining information can be assigned as an optimum database when the next NC program is created.

As described above, according this machining system, the field know-how and other machining information are used only for the modification and editing of an original NC program, and other machining information are inversely analyzed and extracted from an already-modified actual machining NC program used for final field machining. Accordingly, a great advantage is obtained in that this result can immediately be reflected in a database. Due to the reflection of work information in such a database, an NC program creation device can create a program containing the latest and field know-how at all times, and there is an advantage that the modification and editing work from an original machining program to an actual machining program can be made much more simple than before.

Further, in the case of reflection of such machining information in a database, for example, the machining information can be reflected in the database before several machining elements are machined after actual machining has started, and can immediately be applied to readjustment of a subsequent NC program or the current NC program.

Furthermore, according to this system, each database in which the machining information described previously was reflected can be arbitrarily applied to any machine tool which is constituting a CIM (computer integrated manufacturing) system. Needless to say, even if a base material or the final component shape is changed, the portion of a database related to a machine tool or a tool can be converted as it is. By releasing such data to all terminal devices which constitute the CIM system, it can also be used in creation of any numerical control information or the execution of this creation. Such an excellent advantage, in this embodiment, depends on the fact that the machining information is modularized as machining conditions for each and every work element machining, thereby considerably improving the general purpose usability of a stored database.

The analysis of an NC program and the extraction process of machining information or machining conditions in the machining method analyzer 34 are described below in detail according to actual examples.

Figure 2:
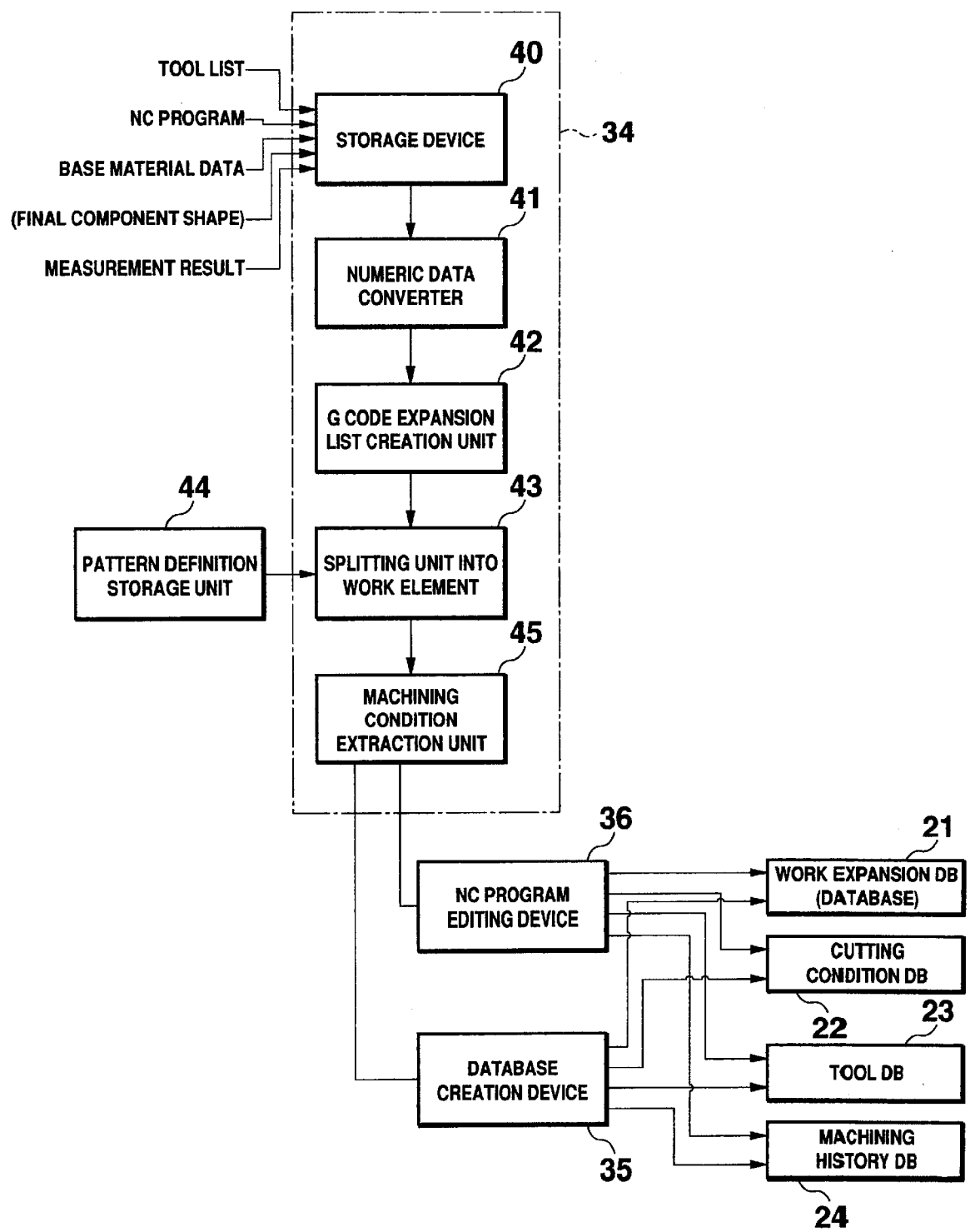
FIG. 2 is a block diagram showing the principal part of an NC machining system related to the present invention in the system shown in FIG. 1.

FIG. 2 is an enlarged diagram of the portion of a program analyzer in the numerically controlled system (FIG. 1) described above. An actual machining NC program, base material data and a tool list are input to the machining method analyzer 34 as described previously, and as occasion demands, the final machining shape and a measurement result are also input to the machining method analyzer. In the machining method analyzer 34, each of the input data is stored in a storage device 40 and an actual machining NC program is analyzed by one block. Data is converted by a numeric data converter 41 and each item of data is registered as a G code expansion list in a G code expansion list creation unit 42. At this time, if a plurality of operations are performed in one block such as a microprogram and a subprogram, the data is registered in the G code expansion list after it has been expanded into a basic instruction in accordance with the RS-274-D format. Although the expansion into this G code is not always necessary in the present invention, in this embodiment an actual machining NC program is expanded into an easy-to-analyze G code so that is can be processed by a computer.

In the machining method analyzer 34, a continuous actual machining program is split for each work element in a splitting unit 43 into a work element referring to the G code expansion list. Then, the G code expansion program split for each work element extracts the machining conditions for each work element in an extractor 45 referring to pattern definitions stored in a pattern definition unit 44. The machining conditions for each work element extracted in this manner are stored in the work expansion database 21, the cutting condition database 22, the tool database 23 and the machining history database 24 via the database creation device 35 described previously.

Usually, it is desirable that program splitting for each work element machining in the splitting unit 43 be performed paying attention to a sequence (N number), tool indexing (T code), tool change (M6) and optional stop (M01). In fact, the program splitting into such a work element is performed paying attention to tool change in the first place. Because a single tool is used during tool change, it can be used as the end of the work element. However, because a plurality of work element machining operations may be performed using the same tool, for example, a plurality of prepared holes may be drilled by the same drill, it is desirable that a tool trace pattern be read in addition to the tool change and the splitting for each work element machining be accurately performed as a result.

The machining condition extractor 45 extracts necessary machining conditions from the program split for each work element described previously. In this embodiment, if it is difficult to directly extract a working condition, what work elements are like is recognized from a tool trace and a work shape within a split range and this result is temporarily created as a workpiece database or each pattern list. As such a pattern list, for example, a drilling element list for drilling is listed.

In this embodiment, the machining conditions described previously are written to each database for each work element machining. As general machining conditions, a machined base material, a tool used and each cutting condition are stored and retained as related data for each work element machining. In this case, it is desirable that the cutting conditions be formed into data as a cutting speed, feed per tooth and feed per revolution of each tool, not as a speed of revolution or feedrate of a tool used usually. Accordingly, modularized data of general purpose usability can be created, and the cutting conditions of an approximate tool diameter can be calculated from these base data.

Thus, various machining conditions are reflected in an NC program in conformity with actual machining. According to this analytic storage mode, the best result can be obtained by faithfully reflecting the practically actual machining in an NC program in many cases.

However, as described previously, it may not always be optimum that in all cases actual machining data is reflected in the NC program as it is. In such a case, in the present invention, the NC program can always be optimized in a new environment by selecting an optimization mode, applying optimization processing to machining conditions thereby and reflecting the machining conditions edited to various databases.

Therefore, in FIG. 1 and FIG. 2, the output of the machining method analyzer 34 is not only supplied directly to the database creation device 35 but is also selectively supplied to an NC program editing device 36, as described previously. Accordingly, whether the machining conditions extracted by the machining method analyzer 34, i.e., the machining condition extractor 45 shown in FIG. 2 in detail are supplied to the database creation device 35 or supplied to the NC program editing device 36 in accordance with the mode selected by the operator is alternatively selected.

It constitutes a characteristic feature of the present invention that if an optimization mode is selected, predetermined editing is applied to the actual machining conditions and the optimization condition after this NC program has been edited is reflected in various databases.

In the present invention, the selection between the analytic storage mode and the optimization mode is performed by allowing the operator to select either of the modes before an NC program is analyzed.

Next, the optimization processing executed in the NC program editing device 36 will be described.
Optimization If the data obtained by making an analysis from an actual machining NC program is compared with the data in the databases 22, 23 and 24 to be input originally and the same machining conditions are provided, the actual machining NC program is corrected under these conditions.

For example, it is assumed that the optimization of cutting conditions such as a width of cut, depth of cut, spindle speed is performed. At this time, if machining information whose part of the cutting conditions is the same can be found in the cutting condition database 22, for example, if the type of machining such as pocket machining and tapping and a tool used are the same, the machining information is used as it is.

On the other hand, if such machining information cannot be found in a database, a piece of or a plurality of similar machining information are selected, and in comparison with the machining conditions which are considered to be optimum are indexed for use. For example, pocket machining and side machining are substantially considered identical in machining conditions. Further, if the type of machining and the type of a tool are identical but there is not the same condition in a tool diameter and there are two different conditions of the tool diameter, their ratios are calculated and the conditions in the case of the relevant tool diameter are indexed.

Furthermore, if such similar machining conditions that can be compared as described above cannot be found in the database, the optimization of the portion is not performed and the reflection of machining conditions in an NC program is also not performed.
Optimization of Machining Method Next, for example, in a machining tool path through which the peripheral machining of a large circle is performed on the base material of a rectangular parallelepiped, for such a tool path through which an actual machining NC program allows even an idle cutting portion to travel at the same feedrate as a cutting portion, the actual machining NC program is changed to such a machining method where the idle cutting portion travels linearly at a rapid traverse.

Further, in machining in relation to a plurality of surfaces, if a machining method in which priority is given to a surface and a machining method in which priority is given to a tool are stored in a database, the tool change time and indexing time of a machine tool which performs the machining are compared, and whether surface-priority machining is performed or tool-priority machining is performed is judged. If the judgment result and the actual machining NC program differ, the actual machining NC program is changed.

Furthermore, the sequence of tools used is optimized so that the number of tool change times can be reduced.

In the present invention, there are two types of optimization. One optimization type can be selected after the optimization has been completed, or the other optimization can be selected when the optimization starts.

By performing these two types of optimization, two actual machining NC programs are created. The operator checks these programs and selects an optimum one. Otherwise, if which optimization is to be performed is predetermined, only the optimization is performed if it is specified before optimization.
Optimization by Machining Time Priority (Speedup)

A width of cut and a depth of cut are set so that the number of depth of cut times can be reduced within the allowable range of machining conditions.

An idle cutting portion travels linearly at a rapid traverse.

For surface priority or tool priority, a machining method whose machining time is short is selected. Optimization by Machining Surface Priority (High Precision)

Emphasis is placed on cutting conditions.

Even if there is an idle cutting portion, the portion does not travel linearly at a rapid traverse but a tool path through which a series of movements are performed is used.

Even if the machining of a plurality of surfaces is performed, it is performed by surface priority.

One Example of Program Optimization

FIG. 3A, FIG. 3B or FIG. 3C shows an example of an actual machining NC program used in this embodiment, and a program number 00001 is assigned to the NC program.

FIG. 4 shows a base material shape machined in this actual machining NC program. Further, FIG. 5 shows the final machining shape manufactured from the base materials shown in FIG. 4 by this actual machining program, and these base material data (including materials) and the final machining shape are supplied to the machining method analyzer 34 as data, as described previously. As is evident from FIG. 5, in this machining, the top facing and side facing of a base material, and the circle side machining of the top face, two drilling with chamfers and the tapping of the front face are requested.

FIG. 6 shows the tool list used in a program 00001, and each tool number is indicated by a T code. Each tool data is listed as shown in the diagram and this tool list is supplied to the machining method analyzer 34 as described previously. As shown in FIG. 2, in the machining method analyzer 34, first, after an actual machining NC program has been stored in the memory 40, it is converted to a G code expansion list which is easily analyzed by a computer, by the G code expansion list creation unit 42 via the numeric data converter 41.

FIG. 7A, FIG. 7B, FIG. 7C, FIG. 7D or FIG. 7E show a list of states in which the actual machining program 00001 is expanded to a G code, and both are linked by a line number and their contents are substantially the same.

FIG. 8B shows a cutting condition database among the machining conditions extracted for each work element by splitting the G code expansion list of the actual machining program 00001 created in this manner for each work element.

Also, FIG. 8A shows a past cutting condition database extracted and stored in the same manner as above, and shows the cutting condition database indicated by the code 22 in FIG. 1 and FIG. 2.

Based on the examples shown in FIG. 3 to FIG. 8 above, specific examples of optimization processing in this embodiment are described below.

<Optimization by Time Priority>

1) Emphasis is not laid on cutting conditions and the number of width of cut times is reduced.

Cutting condition analysis data and the conditions having the same contents are retrieved from the cutting condition database 22. If the same items (a work element, work material and tool number) are provided, the cutting conditions are compared. If the data of the cutting condition database is larger in a cutting speed, feed per tooth, feed per revolution, width of cut and depth of cut, a actual machining program is corrected based on the conditions.

For example, in the facing roughing (N1 machining of a actual machining program) of a tool number 1, while the depth of cut 2.5 mm for the cutting condition analysis data, it is 4.9 mm for the cutting condition database. Accordingly, in accordance with the conditions of the cutting condition database, the N1 portion of the actual machining program is corrected (N1 portion of the optimization by time priority sample NC program of FIG. 9A).

Further, while, in the side roughing of the cutting condition analysis data, depth of cut of a tool number 5 is 15.0 mm, the depth of cut of the tool number 5 of the cutting condition database is 19.9 mm. A width of cut also differs between the two. This is because a work element differs like side roughing and pocket roughing, and the difference is not considered regarding the data of the width of cut. However, if the final width of cut is smaller than other width of cut, a tool path whose number of width of cut times is reduced by once and the width of cut for the part is evenly allocated to other width of cut is created. For this actual machining program, because the final width of cut is not smaller than other width of cut, a one-time width of cut is not corrected. Accordingly, regarding the depth of cut of the cutting condition database, the N2 portion of the actual machining program is corrected according to conditions (N2 portion of the optimization by time priority sample NC program of FIG. 9A or FIG. 9B).

2) An idle cutting portion travels at a rapid traverse.

In facing, a portion which is traveling at a cutting feed is corrected to a rapid traverse when the Z axis descends to an approach point or moves from one cutting portion to another cutting portion. At this time, an approach distance when a rapid traverse is shifted to a cutting feed and an escape distance when the cutting feed is shifted to the rapid traverse are stored in a numerical controller. In this example, it is assumed that the approach distance at the first Z-axis approach is 10 mm, the approach or escape distance during machining is 3.00 mm, and an actual machining program shall be corrected (N1, N2 or N3 portion of the optimization by time priority sample NC program of FIG. 9A or FIG. 9B).

3) For the priority of a surface or tool, a method having a short time is used and the optimization of a tool sequence is also considered.

Figures 10, 11:
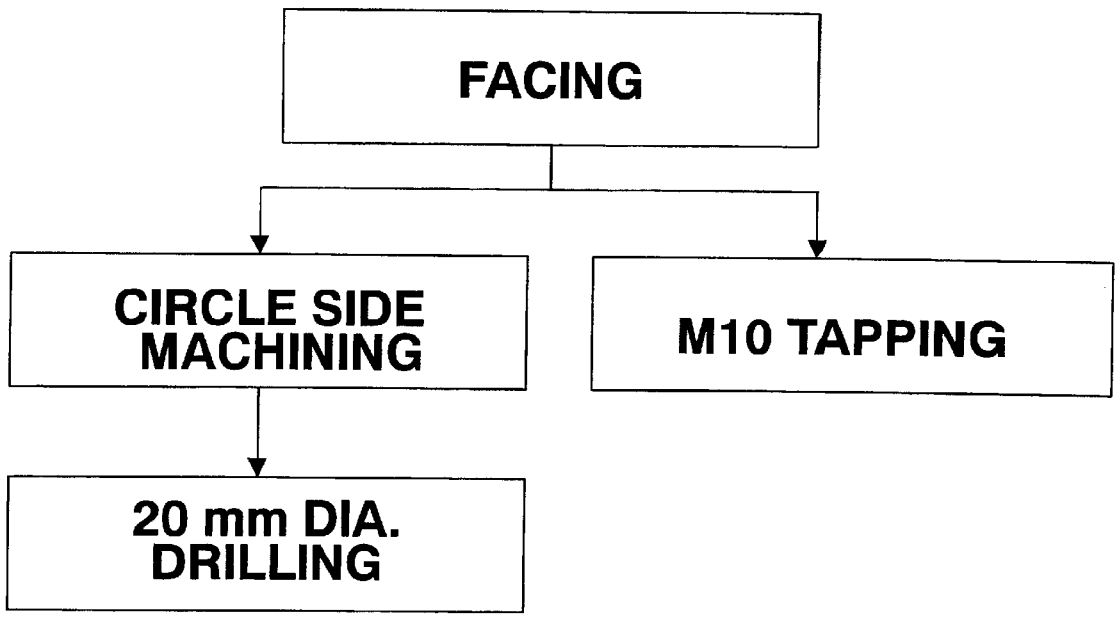
FIG. 10 is a diagram showing a sequence for each machining element of an actual machining program used in an embodiment of the present invention.
FIG. 11 is a diagram showing the sequence of a tool used in each machining element of a actual machining NC program used in an embodiment of the present invention.

First, the optimization of a tool sequence is considered. FIG. 10 is a diagram showing a sequence for each machining element and FIG. 11 is a diagram showing a sequence of a tool used in each machining element.

Referring to FIG. 10 and FIG. 11, the end mill of a tool number 5 is used twice, and its use in the M10 tapping is for spot-facing (counterbore) machining after drilling has been performed by a center drill and a drill. Because the center drill and drill are used even for 20 mm diameter drilling after a circle side face which uses the end mill of the tool number 5 has been machined, the use of this end mill is impossible sometimes. Accordingly, the optimization of a tool sequence is judged to be no longer possible.

Next, the optimization in which surface indexing and tool change are taken into account is considered. FIG. 12A is the surface indexing and tool change list of this actual machining program.

First, referring to FIG. 12A, because there is a tool which machines two surfaces, the sequence of a machining surfaces with the same tool is adjusted so as to become the same as the machining surfaces of tools in the front and in the rear. For the tool of a tool number 1, the former tool is the number 9 used machining the surface of G55 at the end of the program. The later tool is the number 5 tool for machining the surface of G54. Accordingly, it is desirable that the machining sequence of the surface of the tool of the tool number 1 be set to G54 rather than G55. The tool of the tool number 2 shall be used as it is because both the tool in front and the tool in the rear perform machining of the G54 surface. Also the tool of a tool number 8 shall be used as it is because both the tool in front and the tool in the rear perform machining of the G55 surface (refer to FIG. 12B).

Further, it is considered from FIG. 10 and FIG. 11 whether the number of surface indexing times is reduced by changing the sequence of a tool so that the machining sequence of a machining element and the sequence of a tool used for each machining element can be made consistent. Because the sequence of facing, circle side machining and 20 mm diameter drilling cannot be changed, it can be judged from FIG. 10 that the sequence of a tool number 1, 5, 6, 2, 3 or 8 cannot be changed. Because the 20 mm diameter drilling and the M10 tapping are common in the tool numbers 2 and 8, it can be judged to be acceptable even if the machining sequence of the tool number 3 may be located in any position of a tool number 4, 5 or 7. Because the tool number 8 is a tool which machines two surfaces, the tool of the tool number 3 travels intermediately before the tool of the tool number 8. In that case, because the machining of the tool number 3 which performs machining of the surface of G54 is omitted, the machining of the surface of G55 before and behind it can be performed without surface indexing (refer to FIG. 12C). Consequently, the surface indexing which required eight times is reduced to four times.

The optimization by time priority corrects an actual machining program as described above (refer to FIG. 9A, FIG. 9B or 9C).

<Optimization by Precision Priority>

1) Emphasis is placed on cutting conditions.

In the same manner as the optimization by time priority, the cutting condition analysis data and the conditions having the same contents are retrieved from the cutting condition database. If the same items (a work element, work material and tool number) are provided, the cutting conditions are compared. If the data of the cutting condition database is larger in a cutting speed, feed per tooth, feed per revolution, or a one-time cutting width and depth of cut, an actual machining program is corrected based on the conditions of cutting condition database.

For example, for the facing roughing and side roughing of the tool number 1, in the same manner as the optimization by time priority, depth of cut conforms to the conditions of cutting condition database and an actual machining program is corrected (N1 or N2 section of the optimization by precision priority sample NC program of FIG. 13A). Also for the difference in the data of the one-time width of cut of the tool of the tool number 5, an actual machining program is not corrected conforming to the conditions of cutting condition database even if a work element differs in the same manner as the optimization by time priority. Further, because the cutting speed condition of chamfering can be found as only 23 m/min in the cutting condition database, the portion of the cutting speed 33 m/min in the chamfering of an actual machining program is corrected to 23 m/min as shown below (N9 portion of the optimization by precision priority sample NC program of FIG. 13C). S=1000V/πD=1000·23/(π·21)=348.625 . . . ≈350

2) Even if an idle cutting portion is provided, the portion does not travel linearly at a rapid traverse and a tool path in which a series of movements are performed is used.

Like the side roughing or finishing of the optimization by time priority, an attempt is not made to correct the traveling portion from one cutting portion to another cutting portion to a rapid traverse. Further, if such a program is used from the beginning, unlike the optimization by time priority, the linear rapid traverse portion between one cutting portion and another shall also use a cutting feed and an attempt is made not to split the program into a plurality of blocks (a plurality of lines) in a series of tool paths. This is because like the optimization program by time priority, an error in a unit of one thousandth millimeter can be prevented from occurring in the switching position between the cutting and rapid traverse portions.

However, in facing, the portion where the Z axis descends to an approach point is corrected to a rapid traverse (N1, N2 or N3 of the optimization by precision priority sample NC program of FIG. 13A or 13B).

3) A program by surface priority is used and the optimization of a tool sequence is also considered.

First, the sequence of an actual machining program shown as in FIG. 12A is corrected to the actual machining program which successively performs machining on the same surface (refer to FIG. 12D). At this time, this sequence is made consistent with the machining sequence of a machining element of FIG. 10 and the sequence of a tool used for each machining element of FIG. 11.

Next, the optimization of a tool sequence is considered within the same surface. This is performed in the same manner as the optimization by time priority. In this case, a plurality of similar tools are not used within the same surface.

The optimization by precision priority corrects an actual machining program as described above (refer to FIGS. 13A, 13B or 13C).

When both types of optimization are completed as described above, the operator can check both optimized actual machining programs and selects either of them. Accordingly, the mode is automatically switched to an analytic storage mode and moreover, the selected actual machining program can also be corrected. Subsequently, machining and measurement are performed. The data is also input to a machining method analyzer and the machining information and machining conditions are input to various databases.

Besides, in the optimization described above, if there are a plurality of relevant conditions of cutting condition database for correcting an actual machining program, the operator can be allowed to select them at that time. Further, in such a case, it is also acceptable that the cutting condition data which is automatically used most frequently is selected.

Moreover, in both types of optimization, if it is known before optimization which type of optimization is to be performed, either optimization can also be selected when the mode is switched to an optimization mode, and in this case, when the optimization is completed, the mode is automatically switched to an analytic storage mode.

What is claimed is:

1. An optimization device for an NC program in NC machining in which machining control is performed through the NC program, comprising:

a machining method analyzer which analyzes the NC program and extracts machining information or machining conditions;

a storage device which stores said machining information or machining conditions so as to be rewritable; and an NC program optimization device which optimizes said NC program based on at least existing machining conditions extracted from one or more prior NC programs and stored in said storage device.

2. The optimization device of the NC program in the NC machining according to claim 1, wherein said NC program optimization device comprises a mode switching device which switches an optimization mode which optimizes said NC program based on the existing machining conditions stored in said storage device and an analytic storage mode which stores the machining conditions extracted by said machining method analyzer in said storage device.

3. The optimization device of the NC program in the NC machining according to claim 1, wherein said NC program optimization device can optimize said NC program to a plurality of patterns based on the existing machining conditions stored in said storage device.

4. The optimization device of the NC program in the NC machining according to claim 1, wherein said NC program optimization device can select an optimizing condition from a plurality of patterns based on the existing machining conditions stored in said storage device before said NC program is optimized.

5. An optimization method of an NC program in NC machining in which machining control is performed through the NC program, comprising:

a machining method analysis step which analyses the NC program and extracts machining information or machining conditions;

a storage step which stores said machining conditions so as to be rewritable; and an optimization step which optimizes said NC program based on at least existing machining conditions extracted from one or more prior NC programs and stored according said storage step.

6. The optimization method of the NC program in the NC machining according to claim 5, wherein said NC program optimization step comprises a mode switching step which switches the optimization mode which optimizes said NC program based on the existing machining conditions stored according to said storage step and the analytic storage mode which stores the machining conditions extracted according to said machining method analysis step, according to said storage step.

7. The optimization method of the NC program in the NC machining according to claim 5, wherein said NC program optimization step can optimize said NC program to a plurality of patterns based on the existing machining conditions stored according to said storage step.

8. The optimization method of the NC program in the NC machining according to claim 5, wherein said NC program optimization step can select an optimizing condition from a plurality of patterns based on the existing machining conditions stored according to said storage step before said NC program is optimized.

* * * * *